May 5, 1970 R. A. PFUNTNER 3,509,777
GYROSCOPIC DEVICE HAVING MEANS FOR AVOIDING GIMBAL LOCK
Filed Oct. 18, 1967 4 Sheets-Sheet 1

INVENTOR
RICHARD A. PFUNTNER

BY *George A. Herbster*

ATTORNEY

May 5, 1970 R. A. PFUNTNER 3,509,777
GYROSCOPIC DEVICE HAVING MEANS FOR AVOIDING GIMBAL LOCK
Filed Oct. 18, 1967 4 Sheets-Sheet 2

INVENTOR
RICHARD A. PFUNTNER

BY *George A. Herbster*
ATTORNEY

May 5, 1970
R. A. PFUNTNER
3,509,777
GYROSCOPIC DEVICE HAVING MEANS FOR AVOIDING GIMBAL LOCK
Filed Oct. 18, 1967
4 Sheets-Sheet 3
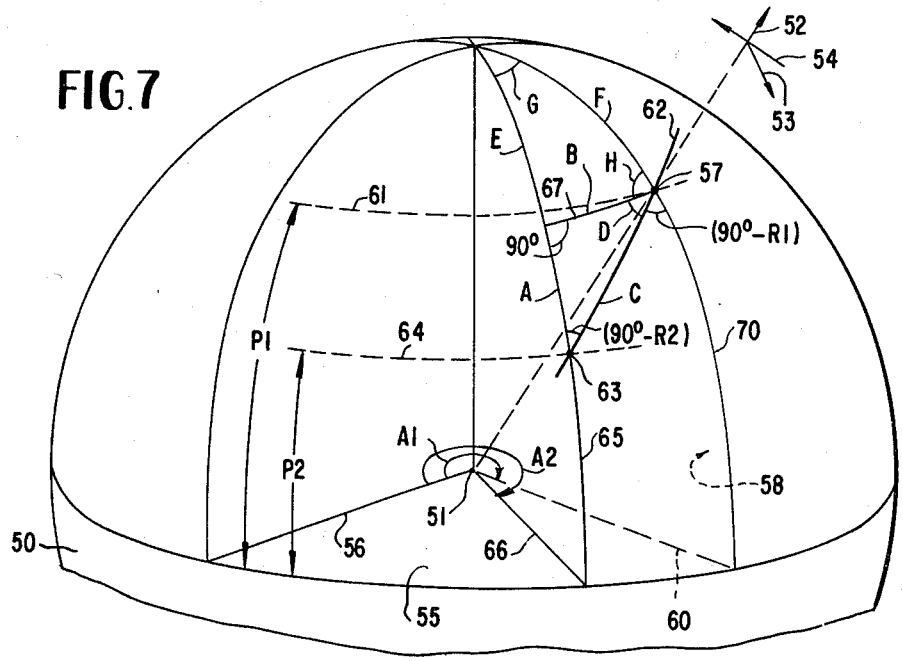
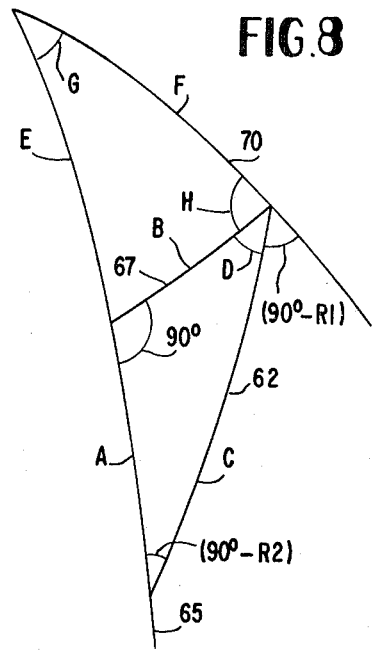
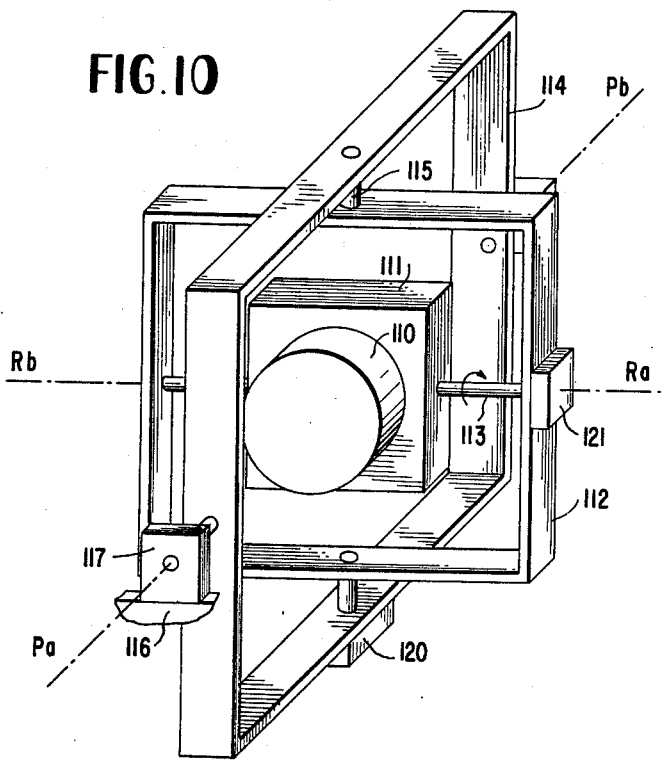
INVENTOR
RICHARD A. PFUNTNER
BY *George A. Herbster*
ATTORNEY

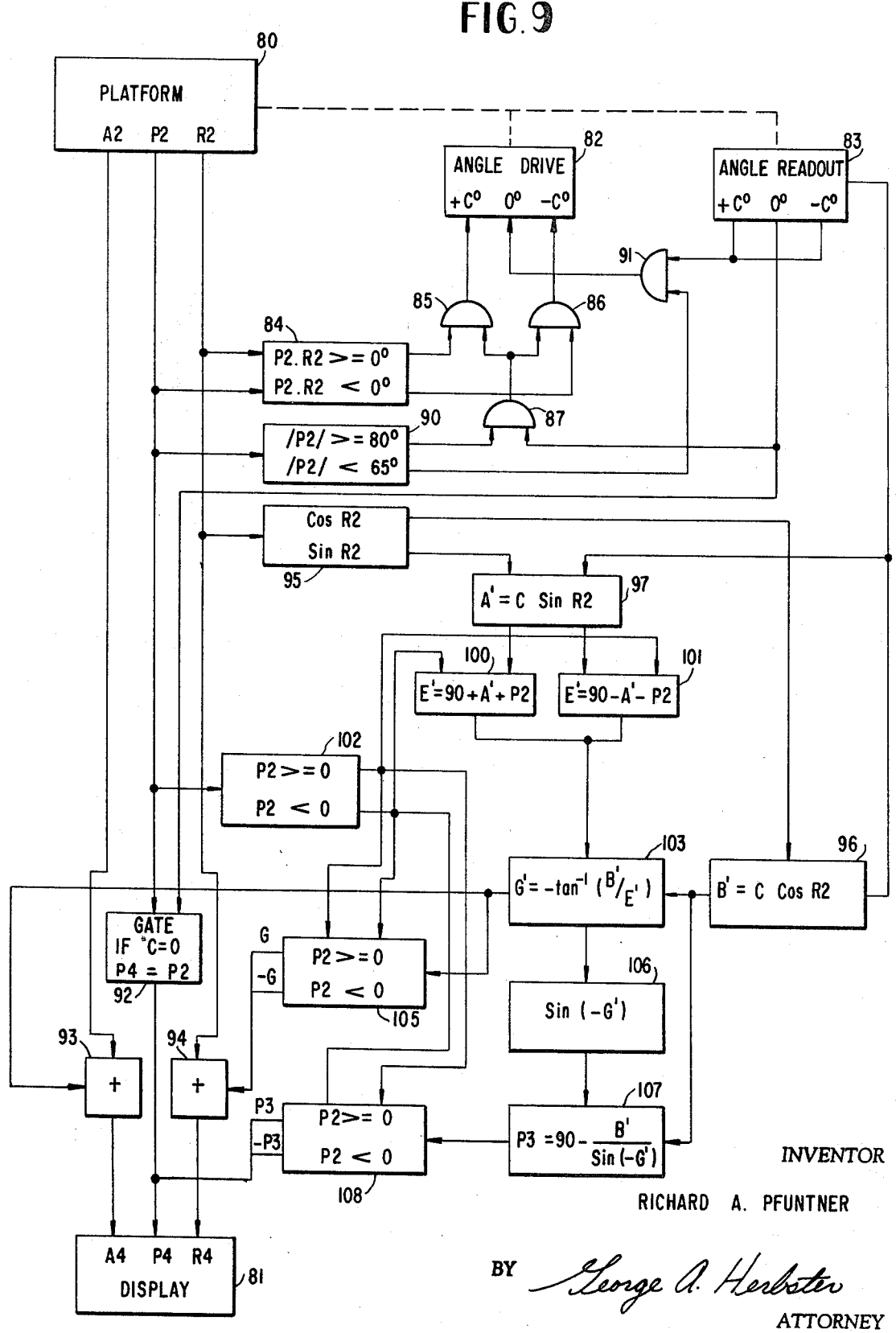

United States Patent Office 3,509,777
Patented May 5, 1970

3,509,777
GYROSCOPIC DEVICE HAVING MEANS FOR AVOIDING GIMBAL LOCK
Richard A. Pfuntner, Lynn, Mass., assignor to General Electric Company, a corporation of New York
Filed Oct. 18, 1967, Ser. No. 676,340
Int. Cl. G01c 19/00
U.S. Cl. 74—5.2          16 Claims

ABSTRACT OF THE DISCLOSURE

Gimbal lock avoidance means for a gyroscopic device. A gyroscopic device housing is rotatably mounted to a maneuverable support, such as an aircraft frame, to be selectively rotated to different fixed positions by a position controller in response to attitude signals from the gyroscopic device. The gyroscopic attitude signals may be modified in accordance with the housing position to indicate true attitude of the support on readout devices.

BACKGROUND OF THE INVENTION

This invention relates to gyroscopic devices and more particularly to universally mounted gyroscopic devices having means for avoiding gimbal lock.

Development of high performance aircraft and missiles using gyroscopic devices, such as single, universally mounted gyroscopes or gyroscopically stabilized platforms, has emphasized the need for avoiding the gimbal lock condition and ambiguities which result therefrom. Several solutions have been proposed, but they often require internal modification of the gyroscopic device. For example, in some gyroscopic devices a fourth gimbal is mounted between an intermediate gimbal and the gyroscope housing. This fourth gimbal is affixed to either the housing or the intermediate gimbal to alter the gyroscope configuration. In other gyroscopic devices, elements in the gyroscope cause gimbals to interfere and thereby alter the configuration of the gyroscope when the gimbal lock position is approached by using the kinematic restraints of the gyroscope. These various schemes, as discussed above, have usually required some internal modification of the gyroscopic device with a resultant increase in size. Some schemes have additionally had the disadvantage of interrupting the flow of attitude information while the gyroscopic configuration was being altered.

While such schemes may be required for direct reading gyroscopes, most attitude systems today use a gyroscope and repeater system wherein the attitude of an aircraft sensed by the gyroscope at a remote location is displayed by the repeater system. In such a system electrical signals are picked off the gyroscopic device and then coupled to the repeater-indicator at a remote location. Usually in such systems the size of the gyroscopic device is important so it is attempted to minimize the size.

Therefore, it is an object of this invention to provide an attitude system which is normally insensitive to the gimbal lock condition.

Another object of this invention is to provide an attitude system wherein the volume occupied by the gyroscopic device is not substantially increased.

Still another object of this invention is to provide an attitude system in which errors are reduced.

Yet another object of this invention is to provide an attitude system which avoids gimbal lock and which is compatible with other schemes for correcting or overcoming the gimbal lock condition.

Yet still another object of this invention is to provide an attitude system which includes means for avoiding the gimbal lock condition wherein it is possible to obtain true attitude indication without interruption.

SUMMARY

In accordance with one aspect of this invention, a gyroscopic device is mounted to a maneuverable frame member or vehicle so that the gyroscopic device housing can be rotated about an axis to a preselected position. When the gyroscopic device senses a certain attitude, it is rotated through a preselected angle to effectively decrease one of the attitude angles sensed by the gyroscope; for example, the pitch angle in a vertically oriented gyroscopic device. Signals from the gyroscopic device may be modified to compensate for this housing shift so the modified signals can provide true attitude information.

This invention has been pointed out with particularity in the appended claims. A more thorough understanding of the above and still further objects and advantages of this invention may be obtained by referring to the detailed description taken in conjunction with the drawings.

BRIEF DESCRIPTION OF THE DRAWINGS

FIGURES 7 and 8 are useful in understanding the mathematical theory of the invention and especially the mathematical theory of operation of the preferred embodiment;

FIGURE 9 is a schematic of one circuit useful for controlling the gyroscope and modifying the signals therefrom in accordance with the preferred embodiment of this invention; and FIGURE 10 illustrates the application of this invention to a directional gyro.

DESCRIPTION OF THE PREFERRED EMBODIMENT

Figure 1:
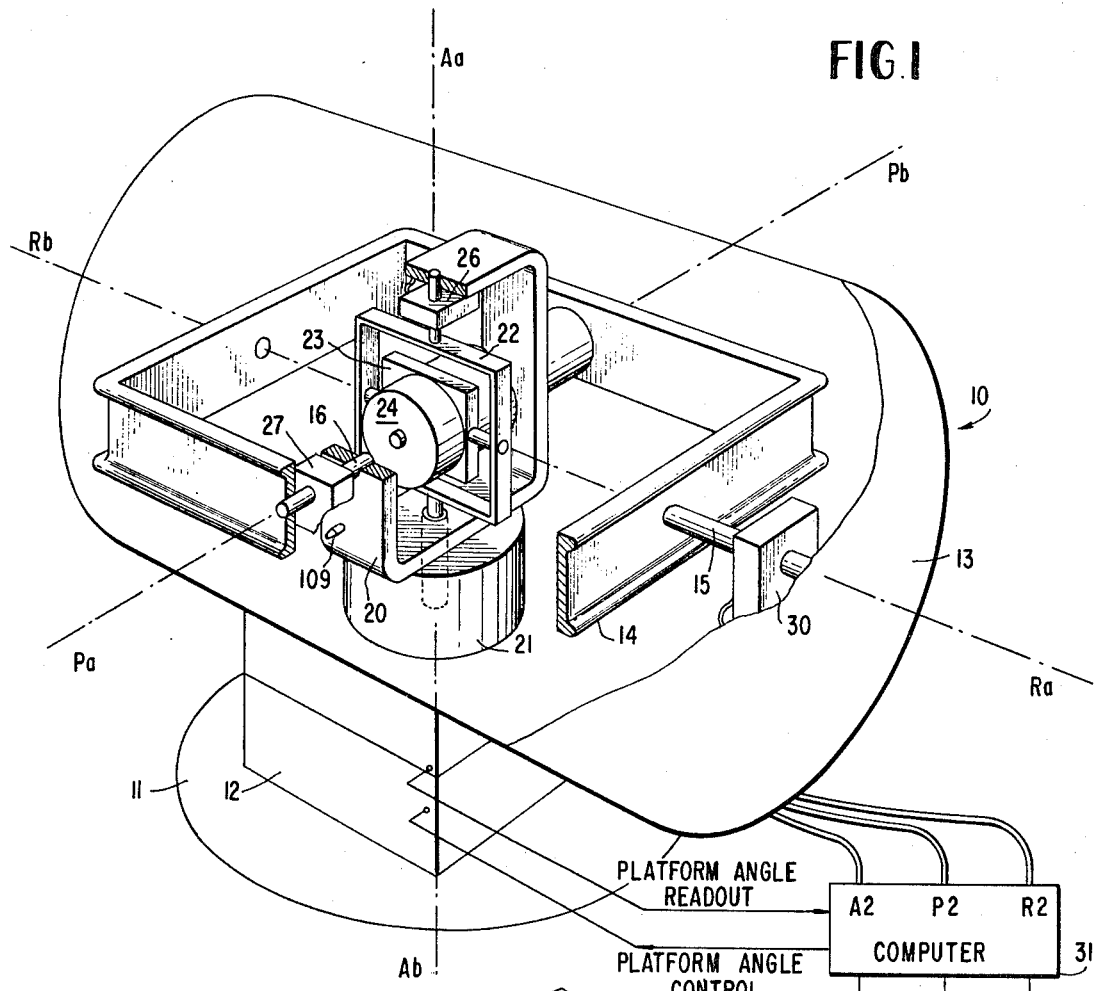
FIGURE 1 illustrates how this invention can be adapted for use in a gyroscopic platform.

This description of the preferred embodiment of the invention emphasizes the application of the invention to gyroscopic devices mounted in an aircraft and especially installations where gimbal lock tends to occur in a loop maneuver in a vertical plane. As will become apparent during the following discussion, this emphasis is made merely for purposes of clarity, continuity, and conciseness. The theory of operation can be applied to any other system in any other environment wherein the gyroscopic device can be maneuvered to the gimbal lock position although certain definitions and statements made during the course of this discussion may require some modification for different applications.

Before analyzing the systems of FIGURES 1 through 6, it will be useful to define certain references and terms used throughout this discussion. For example, it is useful first to describe the aircraft roll, pitch, and azimuth axes. The aircraft roll axis extends fore and aft through the aircraft; it is horizontal when the aircraft is level. An axis through the plane of the wings which intersects with and is perpendicular to the aircraft roll axis constitutes the aircraft pitch axis. The aircraft azimuth axis intersects with and is mutually perpendicular to the aircraft roll and pitch axes.

To analyze the attitude of the aircraft, it is necessary to define certain references. As known, the attitude of an aircraft can be defined in terms of the aircraft pitch angle, designated herein as $P_1$, the aircraft roll angle, $R_1$, and the aircraft azimuth angle, $A_1$. It is useful in the following discussion to imagine a sphere, such as shown in FIG- URE 7, having its center located on an extension of the aircraft roll axis during an instant in time.

Consider a horizontal reference plane through the center of the sphere and an azimuth reference line in the horizontal reference plane extending from the sphere center. The aircraft azimuth angle $A_1$ is defined as an angle in the horizontal reference plane between the azimuth reference line and the aircraft azimuth line in the horizontal reference plane defined by the intersection therewith of a vertical plane through the aircraft roll axis. Generally the aircraft azimuth angle $A_1$ is measured from the azimuth reference line clockwise looking from the top of the sphere. The aircraft pitch angle $P_1$ is the angle between the aircraft azimuth line and the aircraft roll axis taken in that vertical plane. The aircraft roll angle $R_1$ is a planar angle in a roll plane perpendicular to the roll axis between a horizontal line on the roll plane and a roll line formed on that plane by the intersection therewith of a plane including the aircraft roll and pitch axes. The aircraft roll angle also appears as a spherical angle defined by a latitudinal line through the aircraft roll axis and a line formed on a sphere by the intersection therewith of the roll-pitch axes plane. Hence, in the following discussion, the aircraft roll angle and azimuth angle are meaningless if the aircraft is vertical (i.e., $P_1 = \pm 90°$).

Now referring to FIGURE 1, a gyroscopically stabilized attitude system 10 is mounted to an aircraft frame member 11 by a position controller 12. The position controller 12 includes drive means to accurately position the system 10 with reference to the frame member 11. Electrical, electromechanical, hydraulic, pneumatic or other means are available to provide accurate positioning; and as the exact structure of the position controller 12 forms no part of this invention, the details of such a position controller are not discussed herein.

In FIGURE 1 the attitude system 10 is specifically shown as being mounted in a level aircraft. This particular orientation also shows the system in an orientation with respect to the aircraft to provide true attitude information directly. The attitude system 10 comprises a housing 13 which is affixed to the position controller 12. An outer platform gimbal 14 for a vertical gyroscope section is rotatably mounted to the housing 13 by trunnions 15 to permit rotation of the platform vertical gyro gimbal 14 about a platform vertical gyro major axis, which in this configuration is coincident with the roll axis designated $R_a$–$R_b$. Rotatably mounted to the outer platform gimbal 14 for rotation about a platform vertical gyro minor axis shown as being coincident with an aircraft pitch axis $P_a$–$P_b$ on trunnions 16 is an inner platform gimbal 20. A rotatable mass 21 is suspended from the inner platform gimbal 20 and is driven by conventional means about a vertical platform spin axis shown as being coincident with the aircraft azimuth axis $A_a$–$A_b$.

Also mounted to the inner platform gimbal 20 is a directional gyroscopic device including an outer gimbal 22, an inner gimbal 23 and a rotatable mass 24 arranged so that the outer gimbal 22 is rotatable about the platform azimuth gyro major axis coincident with the platform vertical gyro spin axis and so that the various axes of rotation are orthogonal. As the rotatable masses 21 and 24 are rigidly fixed in space when rotating, the intersection of their spin axes is always coincident with the intersection of the aircraft azimuth, pitch and roll axes.

As is known in the art, the attitude of the aircraft is obtained from pickoff devices such as an azimuth pickoff 26, a pitch pickoff 27 and a roll pickoff 30. These pickoffs indicate the angular relationships in the gyroscope or gyroscope device. The azimuth pickoff 26 measures the horizontal angular displacement of the aircraft roll axis from the azimuth reference line defined by the rotating mass 24; this measured displacement or pickoff signal for azimuth is defined as $A_2$. A pitch signal, $P_2$, represents the angular displacement of the aircraft roll axis $R_a$–$R_b$ from a horizontal reference plane maintained by the rotating mass 21 whose spin axis always remains vertical. Also, the angular displacement of the housing 13 from the same horizontal reference plane about the roll axis $R_a$–$R_b$ is obtained as a signal $R_2$ in the roll pickoff 30.

Signals from each pickoff device are then fed into a computer 31 which, from the gyro signals, determines whether the gyroscope is approaching the gimbal lock position so that the housing 13 must be shifted by the position controller 12 and whether any error is inherent in the readings $A_2$, $P_2$ and $R_2$ for the orientation of the attitude system 10. The computer output consists of three sets of signals which are fed to a utilization device such as a display device 32 to indicate the true attitude of the aircraft in space in direct readings which do not require any modification. In addition, the computer also produces a control signal for the position controller 12.

Before proceeding with a quantitative analysis of the preferred embodiment of the attitude system 10, the positions provided by the position controller 12 and the structure of the computer 31, reference should be made to FIGURES 2 through 6. These figures schematically present a qualitative analysis of this invention as applied to a gyro vertical. As the outer gimbal 14, the inner platform gimbal 20 and the rotating mass 21 supported by the housing 13 in FIGURE 1 constitute a gyro vertical, the discussions of FIGURES 2 through 6 are equally applicable to FIGURE 1. In order to simplify the discussion of FIGURES 2 through 6, like numerals are used to designate like elements throughout.

Figure 2:
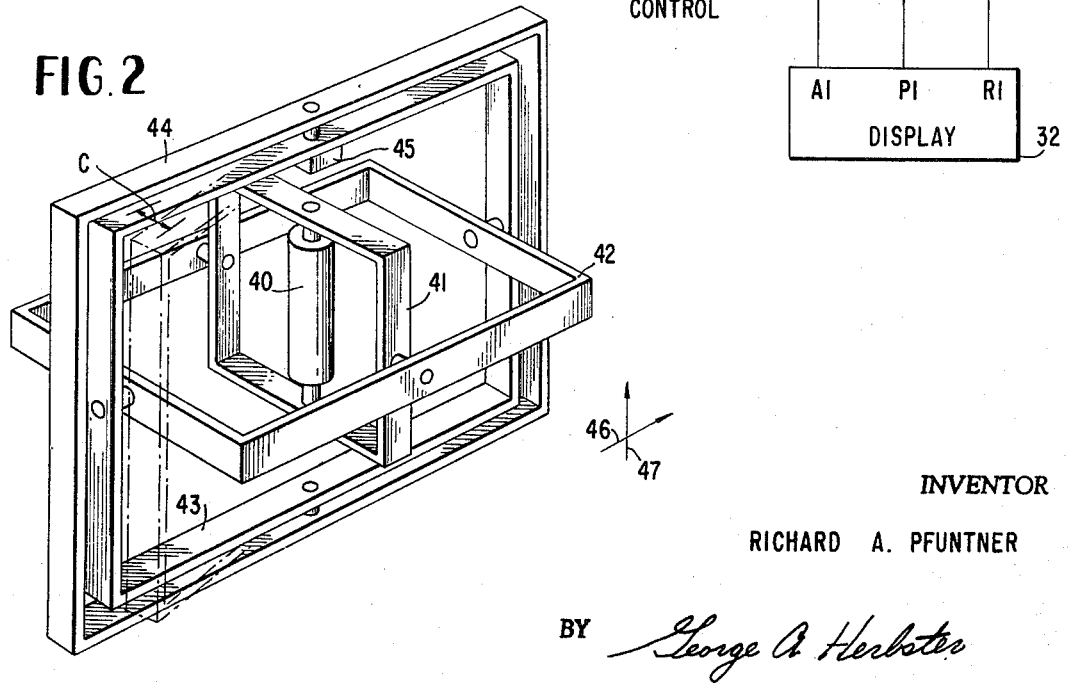
FIGURES 2 through 6, inclusive, qualitatively show the operation of this invention as applied to a schematic representation of a gyro vertical.

FIGURE 2 shows a gyro vertical comprising a rotor 40, an inner gimbal 41 and an outer gimbal 42 arranged in a Cardan suspension so that the spin axis is vertical. The elements are rotatably supported by a housing member 43. Although the housing member 43 is shown as another gimbal in this series of diagrams, in actual application the outer gimbal 42 would be rotatably mounted to the gyro housing. It is felt that the simulation of the housing by the gimbal-like housing member 43 will aid in the understanding of this invention.

The housing member 43 is then mounted to a maneuverable support 44 such as an aircraft frame element. Normally the gyroscope is oriented as shown in FIGURE 2 with a position controller 45 maintaining the housing member 43 as shown. If the maneuverable support 44 is moving in a direction shown by an arrow 46 with the aircraft azimuth axis generally designated by an arrow 47, the gyroscope gimbals and axes are orthogonal.

Figure 3:
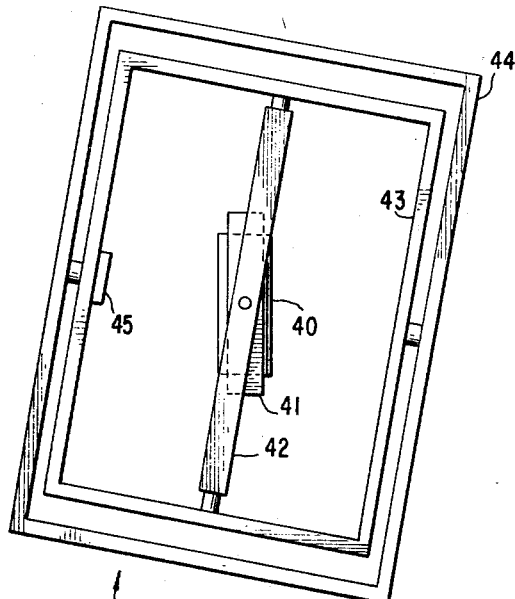

Now assume that the maneuverable support 44 starts through a looping maneuver in a vertical plane. Without gimbal lock protection, a major axis (i.e., the axis about which the outer gimbal 42 rotates) tends to align with the spin axis when the maneuverable support 44 is vertical. FIGURE 3 shows the configuration near the vertical as defined by the arrows 46 and 47. It will be noted that if the pitch of the aircraft were increased to 90°, the major and spin axes would align with resultant loss of rigidity in a manner known in the art.

Figure 4:
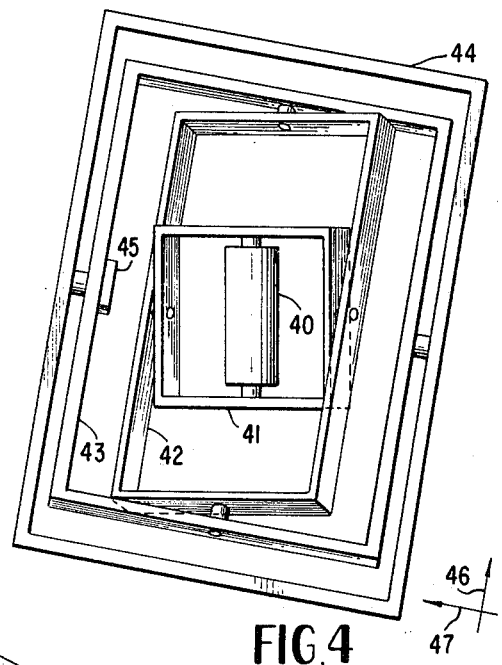

In this attitude, however, assume that the position controller 45 is actuated to rotate the housing support 43 with respect to the maneuverable support 44 through an angle C about the aircraft azimuth axis designated by the arrow 47. As the spin axis remains vertical, the kinematic restraints of the gyroscope cause the gimbal relationships to change. Without any change in attitude of the maneuverable support 44, the angles between the gimbals 41 and 42 and between the gimbal 42 and the housing support member 43 vary so that the pitch angle seen by the gyroscope decreases. By rotating the housing support 43 as shown in FIGURES 3 and 4, it will be obvious that continued movement of the maneuverable support 44 through the vertical in the vertical plane does not produce gimbal lock because the major and spin axes cannot align. In both FIGURES 3 and 4 it is assumed that the maneuverable support 44 is in the same position.

Figure 5:
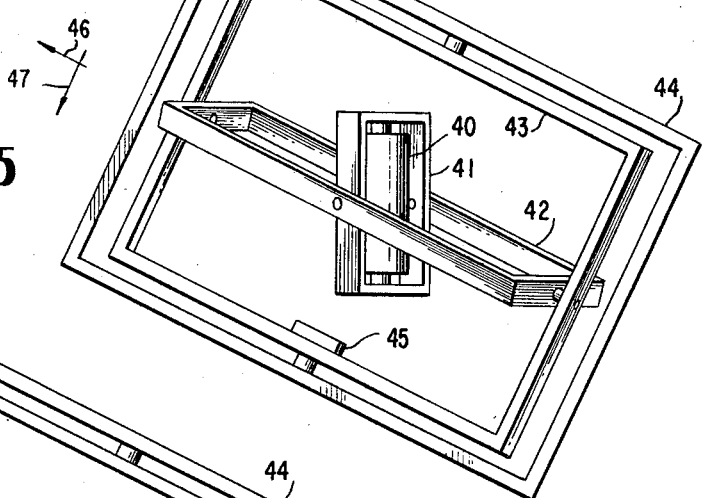
Figure 6:
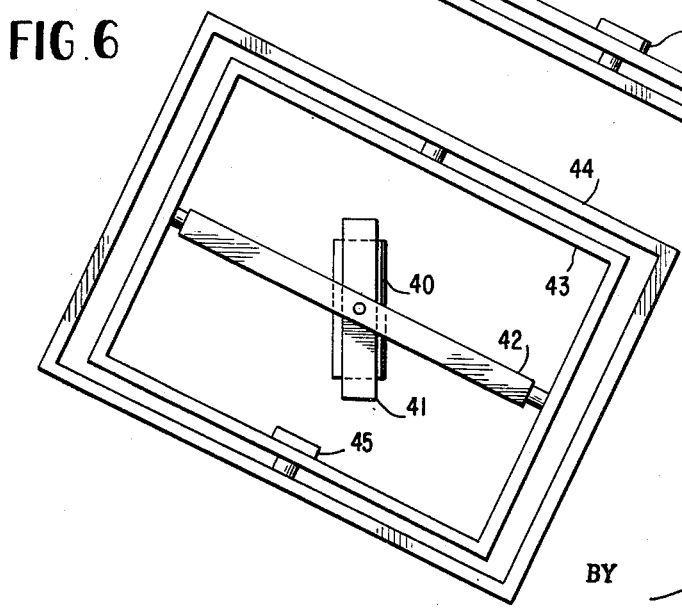

After passing through the vertical, continuation of the maneuver brings the maneuverable support 44 to the position shown in FIGURE 5. The angular displacement between the housing support member 43 and the maneuverable support 44 has been maintained constant by the position controller 45. The aircraft is now inverted as shown by the arrows 46 and 47, and the outer gimbal 42 has rotated about its axis so no ambiguity results. Once the maneuverable support 44 is beyond the gimbal lock position, the housing support member 43 may be realigned. This change is illustrated in FIGURE 6; and comparison of FIGURES 5 and 6 shows that the gimbal relationships are again altered for a given attitude of the maneuverable support 44.

In the figures discussed thus far, it has been assumed that the housings have been pivoted about the aircraft azimuth axis. This assumption is carried forward in the detailed mathematical discussion which can be made with reference to FIGURE 7.

FIGURE 7 shows a portion of reference sphere 50 having a center 51. An aircraft or other vehicle is represented by arrows 52, 53, and 54 which are the aircraft roll, pitch, and azimuth axes, respectively. The horizontal reference plane 55 and the azimuth reference line 56 are also depicted. In accordance with the definitions, the sphere center 51 is located on an extension of the aircraft roll axis 52 so that the true aircraft attitude may be defined in terms of angles $P_1$, $R_1$, and $A_1$ for a given aircraft operating point 57. A vertical plane 58 intersecting the horizontal reference plane 55 at the aircraft azimuth line 60 defines, with the azimuth reference line 56, the true aircraft azimuth $A_1$. The angle between the aircraft azimuth line 60 and the extension of the aircraft roll axis 52 is the aircraft pitch angle $P_1$. This angle is shown as being a spherical angle between the horizontal reference plane 55 and a dashed latitudinal line 61 through the aircraft operating point 57. A great circle 62 is defined on the sphere 50 by the intersection therewith of a plane defined by the aircraft roll and pitch axes 52 and 53. The spherical angle between the great circle 62 and the latitudinal line 61 is the aircraft roll angle $R_1$.

If the gyroscopic device is swung about the aircraft azimuth axis 54 by an angle C, the rotor of a gyroscope such as that shown in FIGURES 3 and 4 remains stationary in space. However, the housing position change relative to the aircraft changes the orientation of the gyroscope axes and especially the major axis of a vertical gyroscope through an angle C measured in the plane defined by the aircraft roll and pitch axes 52 and 54. On the sphere 50 this angle appears as a portion of the great circle 62 defined by C. In spherical coordinates the length of the line C equals the angle C.

Changing the gimbal relationships causes a new gyroscope operating point 63 to exist, and gyroscope attitude angles of pitch, roll, and azimuth ($P_2$, $R_2$, and $A_2$) are provided for the same aircraft attitude. A dashed latitudinal line 64 passes through the gyroscope operating point 63, and the spherical angle between the dashed latitudinal line 64 and the horizontal reference plane 55 is the indicated pitch angle $P_2$. A vertical plane through the gyroscope operating point 63 defines a vertical great circle 65 and a gyroscope azimuth reference line 66. The indicated azimuth angle $A_2$ is then the angle defined by the reference azimuth line 56 and the gyroscope azimuth line 66 while the indicated roll angle $R_2$ is defined as the spherical angle between the dashed latitudinal line 64 and the great circle 62.

With some mathematical manipulation it is possible to determine the incremental change in azimuth, pitch, and roll caused by shifting the gyroscopic device about the aircraft azimuth axis. To simplify the mathematical analysis, another great circle 67 is defined so that it intercepts the aircraft operating point 57 and is perpendicular to the great circle 65. Hence, two right spherical triangles are defined by the great circles 62, 65, and 67 and a great circle 70 defined by the intersection of the vertical plane 58 with the sphere 50. To simplify the analysis, the two right spherical triangles are shown in FIGURE 8. One triangle, formed by the great circles 62, 65, and 67, has sides C, A, and B formed by portions of those great circles, respectively. The angle opposite side C is, by definition, a right spherical angle. Also by definition, the angle defined by the sides A and C is equal to $(90°-R_2)$ while the spherical angle defined by sides C and B is designated D. The other right spherical triangle is formed by great circles 65, 67, and 70 and has sides E, F, and B with sides E and F defining an angle G while sides F and B define an angle H. In addition, the angle defined by the great circles 70 and 62 is equal to $(90°-R_1)$. Utilizing these figures, it will be obvious that several relationships exist in the two right spherical triangle in accordance with the following equations:

(1) $\sin(B) = \sin(90°-R_2) \sin(C) = \cos(R_2) \sin(C)$ (2) $\sin(A) = \tan(B) \cos(90°-R_2)$
$= \sin(C) \sin(R_2)/\cos(B)$ (3) $\cos(D) = \sin(90°-R_2) \cos(A) = \cos(R_2) \cos(A)$ (4) $\quad E = 90° - A - P_2$ (5) $\quad \cos(F) = \cos(E) \cos(B)$ (6) $\cos(H) = \tan(B) \cos(F)$
$= \sin(B) \cos(E)/\sin(F)$ (7) $\quad \cos(G) = \sin(H) \cos(B)$ (8) $\quad P_1 = 90° - F$ (9) $\quad A_1 = A_2 - G$

(10) $\quad R_1 = H + D - 90°$

An examination of Equations 1 through 10 shows that all these equations can be solved knowing the gyroscope readings, $A_2$, $P_2$ and $R_2$, and the angle the gyroscope is displaced about the aircraft azimuth axis. Solving for these equations will then provide the true aircraft attitude angles $A_1$, $P_1$ and $R_1$ so that shifting the gyroscope about the aircraft azimuth axis has no effect on the readings.

Certain approximations greatly simplify Equations 1 through 10 without a loss of acceptable accuracy if the angle of rotation, C, is small. By keeping C small, the approximation that $\sin(C) = C$ can be made to simplify Equation 1 which can then be rewritten as:

(11) $B' = C \cos(R_2)$

As $\cos(R_2)$ is always less than 1 and as C is small, $C \cos(R_2)$ is also small so an approximation $B = \sin(B)$ may also be made. If B is small, then $\cos(B)$ approaches unity and the same analysis allows Equation 2 to be written as:

(12) $A' = C \sin(R_2)$

As A is a small angle, $\cos(A)$ approaches unity and Equation 3 can be rewritten as:

(13) $D' = R_2$

If the gyroscope is shifted only when the indicated pitch angle is large (e.g., greater than 80°, then the angle E is small. Hence, the spherical triangle formed by great circles 65, 67, and 70 can be approximated by a plane triangle. Using the first two terms of Maclaurin's series, Equation 5 becomes:

(14) $\left(1 - \frac{F'^2}{2}\right) = \left(1 - \frac{E'^2}{2}\right)\left(1 - \frac{B'^2}{2}\right)$ and

(15) $F'^2 = E'^2 + B'^2$

Equation 15 relates the lengths of sides for a plane right triangle having a hypotenuse F and sides E and B. Looking at FIGURE 8, it can be seen that using this assumption,

(16) $H = 90° - G$ that

(17) $G' = \tan^{-1} B'/E'$ and that

(18) $F' = B'/\sin(G')$

Finally, using the approximation of Equation 13, Equations 8, 9, and 10 can be rewritten as:

(19) $P_4 = 90° - F'$
(20) $A_4 = A_2 - G'$
(21) $R_4 = R_2 - G'$ where $A_4$, $P_4$, and $R_4$ are the approximations of true aircraft attitude.

A computer and system capable of being used are shown in FIGURE 9. Indicated angles $A_2$, $P_2$, and $R_2$ from a platform 80 are coupled to a display device 81. An angle drive 82 is coupled to the housing of the platform 80 to maintain it at an angle of 0, +C or −C. As pointed out above, a suitable angle is C=10°. An angle readout 83 produces a signal which indicates whether the platform is at ±C or at 0°.

For certain attitudes it is necessary to define a direction for the angle C. In accordance with the definitions used thus far and in the system of FIGURES 1 through 6 and the mathematical analysis associated with FIGURES 7 and 8, the gyroscope indicated roll angle will not exceed 180°; it is positive, negative, or zero. If the indicated roll is zero or positive, then a positive displacement is indicated if the pitch is also equal to zero or positive. An analysis of the remaining quadrants or attitudes of the aircraft shows that the direction of housing displacement is a function of the product of the indicated roll and pitch angles $R_2$ and $P_2$. Therefore the roll signal $R_2$ and the pitch signal $P_2$ are transferred to a network 84 which places an input signal into one of the AND circuits 85 86. The other inputs to the AND circuits 85 and 86 are from the output of still another AND circuit 87. If the AND circuit 87 is energized, then the angle drive 82 will cause the platform to be shifted + or −C° in accordance with the sign of the product of the indicated pitch and roll angles $P_2$ and $R_2$.

To satisfy the assumptions made for the approximations, a pitch monitor circuit 90 is energized by the pitch signal $P_2$ and produces an output signal which is transferred to the AND circuit 87 if the pitch angle is large (e.g., greater than 80° π. The other input to the AND circuit 87 is the zero output from the angle readout circuit 83. Therefore, it will be obvious that the housing is shifted only if the indicated pitch angle exceeds 80° and the gyroscope housing is in its normally oriented position. Another AND circuit 91 is energized by the "C" output of the angle readout 83 and a signal from the pitch monitor circuit 90 which exists if the angle decreases below a certain value. Although this could be chosen to be an indicated pitch angle of less than 80°, to avoid hunting, overlap is provided; therefore, the pitch monitor circuit 90 energizes the AND circuit 91 when the indicated pitch angle $P_2$ decreases below 65°. It will be noted that the pitch monitor circuit reads the absolute values of the indicated pitch $P_2$ to make the system operate for both positive and negative pitch angles.

This circuit and its controlling action on the housing position for the platform 80 can be described logically in the following statements:

(1) If the platform is displaced by 0° and the pitch is less than +80° but greater than −80°, then the platform remains in its position;

(2) If the platform is at its zero position and the pitch angle exceeds +80° or is less than −80°, then the gyroscope housing is shifted by an angle ±C. If the pitch and roll angles are both positive or both negative, the platform is shifted +C° whereas if the pitch and roll angles are of opposite sign, the gyroscope housing is shifted −C°; and (3) If the platform is positioned at other than the 0 position and the pitch is in the range from −65° to +65°, then the platform is returned to its original position.

An analysis of Equations 1 through 18 shows that the gyroscope pitch is not utilized in obtaining a pitch readout. Rather, a new pitch angle is obtained. Therefore, indicated pitch angles, $P_2$, from the platform 80 are coupled to a gate circuit 92 the output of which is connected to the display device; and the gate permits $P_2$ to pass to the display device only if the gyroscope is in its normal orientation (C=0). The remaining attitude signals $A_2$ and $R_2$ are coupled to an azimuth adder circuit 93 and a roll adder circuit 94.

The roll signal $R_2$ is used to energize a trigonometric function generator 95 which produces two output signals: $\cos(R_2)$ and $\sin(R_2)$. The signal $\cos(R_2)$ is then coupled to a multiplier circuit 96 which is additionally energized by the C signal to produce an output signal $B' = C \cos(R_2)$ in accordance with Equation 11. The other output from the trigonometric function generator 95, $\sin(R_2)$, is coupled to another multiplier circuit 97 which is also energized by the C signal to produce an output signal $A' = C \sin(R_2)$ in accordance with Equation 12. The output of this multiplier circuit 97 is then fed to two function generators 100 and 101. An analysis of the equations shows that Equation 4 varies depending upon whether the pitch angle encountered is positive or negative. Therefore, the function generators 100 and 101 are gated by a pitch polarity monitor circuit 102. If pitch is positive or equal to zero, then an output from the pitch polarity monitor circuit 102 is coupled to the function generator 101 which produces an output signal proportional to $E' = 90° - A' - P_2$. If the pitch is negative, then the function generator 100 is energized to produce an output signal $E' = 90° + A' + P_2$, these signals being generated in accordance with Equation 4. Depending upon which of the two function generators is modified, one of the output signals E' is then coupled to a second trigonometric function generator 103 which produces a signal $G' = -\tan^{-1}(B/E)$ in accordance with Equation 17.

As the azimuth angle $A_2$ is modified in an azimuth summing circuit 93, it is also convenient to have the second trigonometric function generator 103 produce a negative angle so that the azimuth summing circuit 93 has an output in accordance with Equation 19. Therefore, the azimuth reading $A_4$ coupled to the display device 81 is equal to $A_2 - G'$ in accordance with Equation 20.

Analysis of the equations also shows that if the pitch angle is 0 or positive, the output signal from the second trigonometric function generator 103 can be directly added to the indicated roll angle $R_2$ whereas if the pitch angle is negative the sign of the output of the second trigonometric function generator 103 must be reversed. To that end a sign reversal circuit 105 is inserted between the second trigonometric function generator 103 and the roll adder circuit 94 to modify the input to the roll adder circuit 94 in accordance with this set of conditions. Therefore, the output of the roll adder circuit 94, $R_4$, coupled to the display device 81 indicates true aircraft roll in accordance with the approximations.

Utilizing Equations 1 through 18, it will also be seen that the outputs of the multiplier circuit 96 and the second trigonometric function generator 103 are used to obtain a pitch readout $P_3$. The angle obtained from the second trigonometric function generator 103 in accordance with Equation 17 is transferred to a third trigonometric function generator 106 and then to a function generator 107 where it is combined with the output from the multiplier circuit 96. The function generator 107 then produces an output signal $P_3 = 90° - (B'/\sin(-G'))$ in accordance with Equations 8 and 18. This output is coupled to another sign reversal circuit 108 so that the sign of the output $P_3$ is reversed if the pitch angle $P_2$ is negative. If the gyroscope has been displaced through an angle $\pm C$, then the gating circuit 92 permits the display device 81 to be energized only by the output of the sign reversal circuit 108 so that the display pitch angle is formed in accordance with the approximations. If $C=0$, there is no output from the sign reversal circuit 108, and the display device reads the indicated pitch angle $P_2$ directly.

An analysis of this circuit shows that the angle C is small at its maximum value and that the maximum error introduced by the aproximations is at that angle. Therefore, if the angle readout truly and continuously indicates the orientation of the gyro members at the final displaced position, a good approximation of the true attitude information is provided during transient motion. Thus, a need for fast driving the gyroscope is eliminated and a small driving means can be used for a position controller 12 as shown in FIGURE 1. Computer analysis of the circuit shown in FIGURE 9 and the approximations indicates that errors of less than 2° are introduced over the more complex equations, and this percentage is within normally acceptable limits. If overlap in the pitch monitor circuit 90 is decreased (for example, the lower limit of $P_2$ is made 75° so that only a 5° deadband area exists), then errors of less than 1° may be obtained.

This invention has been described with reference to a vertical gyroscope in a horizontally stabilized platform which is rotated about an aircraft azimuth axis. In actually, the gyroscope housing can be rotated about any axis through the center of suspension (i.e., point of intersection of the gyroscope axes) other than one of the two gimbal axes. Rotation about the major axis of a vertical gyro, for example, does not alter all the gyroscope angular relationships. Rotation about the minor axis is by definition the cause of gimbal lock so that the reason for avoiding rotation about this axis is obvious. For any gyroscope a similar analysis may be followed so that true attitude indications are displayed no matter how the gyroscope axes are moved or displaced from their original positions.

As will be obvious to those skilled in the art, there is one set of maneuvers which, for any gyroscope arrangement, will give a gimbal lock condition unless means such as a gimbal stop or other device is utilized. In the platform shown in FIGURE 1, assume that the position controller 12 rotates the housing about the aircraft azimuth axis $A_a-A_b$ to the angle $+C$. If after the housing is rotated the aircraft continues to the vertical and then yaws about the aircraft azimuth axis $A_a-A_b$ through an angle $-C$ or through some maneuver comes to this final position, gimbal lock may occur. However, in normally encountered flight conditions with known aircraft, maneuvers of this particular orientation would be extremely difficult if not impossible. Practically speaking, this orientation probably would occur only in uncontrolled flight. However, as this system for avoiding gimbal lock is compatible with other systems, prior art systems can be combined. For example, in FIGURE 1 a pin 109 is mounted on the inner platform gimbal 20 to interfere with the outer platform gimbal 14 within a few degrees of gimbal lock. In normal maneuvers this engagement will never occur due to the shift in the gyroscope housing orientation.

To further aid in understanding this invention, FIGURE 10 depicts a horizontal gyroscope device incorporating this invention. This gyroscope comprises a rotor 110 having a horizontal spin axis shown in this attitude as being coincident with an aircraft pitch axis $P_a-P_b$. The rotor is mounted to an inner gimbal 111 which is pivotally supported on an outer gimbal 112 by trunnions 113. A universal suspension is completed by pivotally connecting the outer gimbal 112 to a housing support 114 by trunnions 115. In this attitude of a frame 116 and the housing support 114 as determined by the position controller 117, the gyroscope spin, inner and outer axes are coincident with the aircraft pitch, roll and azimuth axes, respectively, and are orthogonally oriented. Azimuth and roll pickoffs 120 and 121 are connected to the trunnions 115 and 113, respectively, to provide azimuth and roll indications. Although the housing support 114 can be mounted to the frame 116 to rotate the housing support to realign the outer axis about any axis other than the inner axis, this particular embodiment shows the axis of rotation as being coincident with the aircraft pitch axis. Signals from pickoffs 120 and 121 would then be used to energize a computer means constructed in accordance with equations which could be developed. Such equations would be developed along the lines suggested hereinabove.

In summary, this invention provides a means for avoiding the gimbal lock position in a gyroscopic device. It may be applied to any gyroscope device which provides direct or indirect readings in any configuration such as a gyro vertical, a horizontal gyro or a stablized gyroscope platform. This invention is particularly adapted, however, to indirect reading platforms. As all additions, modifications, and alternations are external to the housing of the gyroscope, no increase in size is required. Because rotation about any axis which causes the gyroscope angular relationships to vary near the gimbal lock position may be used, greater flexibility in system mounting in a vehicle such as an aircraft is obtained. Small housing displacement is adequate in most applications so wiring and drive mechanisms are simplified. As a gyroscopic device incorporating this invention avoids the gimbal lock position, errors introduced in attitude readings when gimbals were permitted to interfere are eliminated. Finally, it is possible to obtain continuous true attitude information even when the housing is being removed.

All the objects and advantages are obtained by rotating the gyroscopic device housing relative to a supporting frame to vary indicated attitude angles by displacing the housing about an axis other than one of the gimbal axes in an orthogonal orientation of a gyroscopic device. Indicated angles from the gyroscope are then modified in accordance with an angle of displacement to provide true attitude readouts. It will be obvious to those skilled in the art that many types of signal modifying means or approaches may be employed without departing from the true spirit and scope of this invention. As discussed above, this invention can be adapted to any universally mounted gyroscope in a number of different embodiments.

What is claimed as new and desired to be secured by Letters Patent of the United States is:

1. In a gyroscopic device including a gyroscope having a rotor, an inner gimbal and an outer gimbal universally mounted to a housing to define spin, minor and major axes of rotation, the housing being adapted to be connected to a maneuverable support means and the gyroscopic device including first indicating means for indicating angular relationships in the gyroscope, the improvement of means for avoiding the gimbal lock position wherein the major and spin axes align comprising:
   (a) second indicating means for indicating a tendency for the gyroscope to move to the gimbal lock position, and for producing a signal indicating said position;
   (b) said position controller means connected to said gyroscopic device and responsive to the signal from said second indicating means for varying the gyroscopic device angular relationship and the indicated gyroscope angles sensed by the first indicating means; and
   (c) utilization means connected to the gyroscopic device for (obtaining) modifying the signals from said indicating means to obtain true attitude indications for the maneuverable support from the gyroscopic device in spite of the change in gyroscope angle.

2. A gyroscopic device as recited in claim 1 wherein said second indicating means includes means adapted to be connected to the first indicating means for producing signals to energize said position controller means when the gyroscopic device manifests a tendency to move to the gimbal lock position.

3. A gyroscopic device as recited in claim 1 wherein the gyroscope major axis is displaced by moving the housing, said position controller means including drive means adapted to be connected to the maneuverable support means and to the housing for moving the housing relative to the maneuverable support.

4. A gyroscopic device as recited in claim 1 wherein said utilization means includes signal modification means energized by the first indicating means for providing an output signal which is a true attitude signal for the maneuverable support means.

5. A gyroscopic device as recited in claim 1 wherein the gyroscope is a gyro vertical with a vertical spin axis and wherein the first indicating means measures roll and pitch of the maneuverable support, said second indicating means being connected to the first indicating means for causing the gyroscope major axis to be shifted in response to predetermined roll and pitch signals.

6. A gyroscopic device as recited in claim 5 wherein said position controller means rotates the housing about the azimuth axis of the maneuverable support.

7. A gyroscopic device as recited in claim 1 wherein the gyroscope spin axis is horizontal, the first indicating means sensing the angle of rotation between the housing and a gimbal affixed thereto, said second indicating means sensing the angular relationship of the gimbals.

8. A gyroscopic device as recited in claim 7 wherein said position controller means is adapted to move the housing about the roll axis of the maneuverable support means.

9. A gyroscopic device as recited in claim 7 wherein said position controller means is adapted to move the housing about the pitch axis of the maneuverable support means.

10. A gyroscopic device as recited in claim 1 including first and second gyroscopes, one of said gyroscopes being mounted to a table stabilized in space by the other of said gyroscopes, the first indicating means being connected to the platform to provide indications of azimuth, pitch and rotation, the second indicating means being responsive to pitch and roll signals.

11. A gyroscopic device as recited in claim 10 wherein said position controller means rotates the gyroscopic device housing about the maneuverable support azimuth axis in response to signals from said second indicating means.

12. A gyroscopic device as recited in claim 10 wherein said position controller means includes means for indicating the relative position of the housing and the maneuverable support means and means for driving the gyroscopic device housing to a plurality of positions in response to signals from said second indicating means.

13. A gyroscopic device as recited in claim 12 wherein said utilization means includes computer means energized by the signals from the first indicating means for generating trigonometric functions and means energized by said generator means and by the attitude signals from the gyroscopic device indicating means for providing true attitude indication signals.

14. A gyroscopic system adapted for mounting in a manuverable vehicle having azimuth, roll and pitch axes comprising:
(a) a gyroscopic platform having first and second gyroscopes universally mounted in a housing, said first gyroscope having a vertical spin axis and said second gyroscope having a spin axis stabilized horizontally by said first gyroscope, and pickoff means mounted to said platform for indicating the attitude of said housing as indicated azimuth pitch and roll signals;
(b) means adapted to mount said platform housing to the maneuverable vehicle, said mounting means having means for driving said housing to a plurality of preselected positions;
(c) computer means energized by said pickoff means and including:
(i) means for sensing the pitch signal;
(ii) control means energized by said indicated pitch and roll signals and said pitch signal sensing means, said control means energizing said driving means for predetermined indicated signals to locate the housing at a preselected position to vary the indicated signals; and
(iii) signal modifying means energized by said pickoff means and said major axis orientation means for producing true azimuth, pitch and roll signals indicating the attitude of the maneuverable vehicle in space.

15. A gyroscopic system as recited in claim 14 wherein said first gyroscope has inner and outer gimbals defining said major and minor axes, said gyroscope additionally comprising a pin mounted thereto to cause interference between said inner and outer gimbals when the major axis and spin axis tend to come into alignment, said pin being disposed so that said interference occurs only after said housing has been shifted to one of said preselected positions.

16. A gyroscopic system as recited in claim 15 wherein said platform mounting means is adapted to be mounted to the maneuverable vehicle for rotating said platform housing about the vehicle azimuth axis.

References Cited

UNITED STATES PATENTS

| | | | |
|---|---|---|---|
| 2,493,015 | 1/1950 | Newton | 74—5.2 |
| 2,649,809 | 8/1953 | O'Neil | 74—5.2 |
| 2,745,091 | 5/1956 | Leffler | 74—5.8 XR |
| 2,802,364 | 8/1957 | Gievers | 74—5.2 |
| 3,188,870 | 6/1965 | Lerman | 74—5.2 |
| 3,203,261 | 8/1965 | Moore et al. | 74—5.2 XR |

FRED C. MATTERN, JR., Primary Examiner

M. A. ANTONAKAS, Assistant Examiner